Oct. 14, 1958
H. D. WARSHAW
2,856,540
INFRARED DETECTION APPARATUS
Filed Dec. 30, 1954
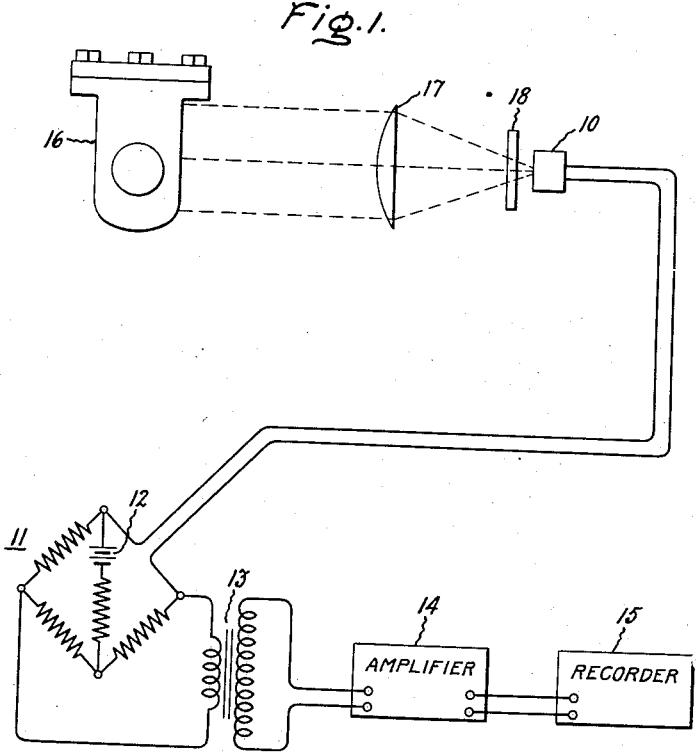
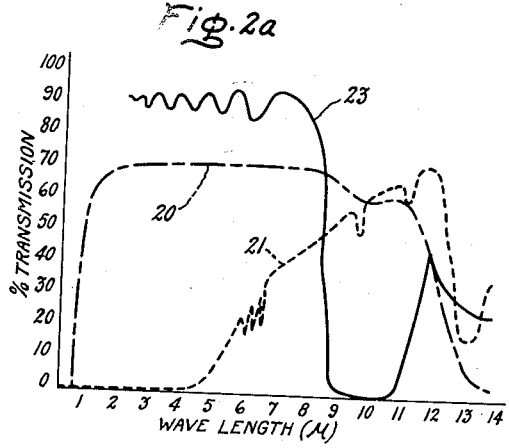
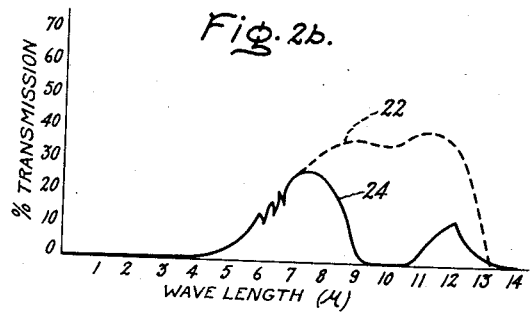
Inventor:
Howard D. Warshaw,
by Howard D. Ahlacher
His Attorney.

United States Patent Office 2,856,540
Patented Oct. 14, 1958

2,856,540

INFRARED DETECTION APPARATUS

Howard D. Warshaw, Schenectady, N. Y., assignor to General Electric Company, a corporation of New York Application December 30, 1954, Serial No. 478,727

2 Claims. (Cl. 250—83.3)

This invention relates to infrared detection apparatus.

Numerous occasions arise when it is desirable to have available infrared detection apparatus that is relatively insensitive to radiation from the sun, and yet sensitive to a hot object passing within the range of the equipment. For example, the railway industry has long felt a need for apparatus of this type that may be mounted beside the track and that will detect and give warning of the passing of a railway car having a hot or overheated journal box. Such apparatus must of necessity be adaptable for outdoor use, and preferably should be insensitive to radiation from the sun or to changes in that radiation such as might be caused by clouds passing between the sun and the earth or by a passing object momentarily reflecting an increased amount of the sun's radiation into the apparatus.

Accordingly, a primary object of the present invention is to provide an infrared detection apparatus that is relatively insensitive to radiation from the sun and to variations in that radiation, but which embodies high sensitivity to radiation from hot bodies other than the sun.

Another object is to provide infrared detection apparatus whose output may be utilized to give a warning or to make a permanent record of the passing of a hot object within the range of the apparatus.

Infrared detection apparatus constructed in accordance with the invention includes conventional detector means such as a bolometer and may include means for focusing the radiation on the detector means. Filter means are located between the radiating object and the detector in the path of the radiation, and serve to filter out that radiation having wavelengths less than five microns. The majority of the radiation from the sun falls within this region. In the preferred embodiment of the invention, the focusing means comprises a material that transmits only radiation having wavelengths less than approximately 13 microns. However, there still remains a small amount of radiation from the sun having wavelengths in the neighborhood of ten microns. Therefore, the focusing means may also embody additional filtering means to reject the radiation passing therethrough having wavelengths in the 9-11 micron region.

The bolometer is connected as one arm of a D. C. bridge circuit, which is unbalanced by any change of resistance of the bolometer due to radiant energy incident thereon. The output of the bridge circuit may be connected into an amplifier or other device through an element such as a transformer in order to suppress all but momentary unbalances. Thus, when the bridge is temporarily unbalanced by a hot object passing within the bolometer range, a pulse is produced across the transformer windings, and the pulse after amplification may be recorded or used to actuate warning or other equipment.

The novel features which are believed to be characteristic of the invention are set forth with particularity in the appended claims. The invention itself, however, both as to its organization and method of operation, together with further objects and advantages thereof, may best be understood by reference to the following description taken in conjunction with the accompanying drawing, in which Fig. 1 is a diagram of one embodiment of the invention; and Figs. 2a and 2b are diagrams illustrating the characteristics of various filters used in the apparatus of the invention.

Referring now to Fig. 1, it is seen that the infrared detection apparatus of the invention includes detecting means 10, which may be a conventional bolometer. As is well-known, a bolometer includes an element whose electrical resistance changes when radiation is incident thereon. In the present case, the variable resistance element of the bolometer is connected as one arm of a conventional resistance bridge circuit 11, whose other arms comprise resistances equal in value to the resistance of the bolometer element when not exposed to radiant energy. The bridge may be energized from a source of direct current such as a battery 12. If the bridge is initially balanced and then the resistance of the bolometer changes because of radiant energy incident thereon, the bridge is unbalanced and output voltage appears thereacross. Such resistance bridges are well-known in the art and a more detailed explanation of their operation is believed unnecessary.

The output of the bridge is connected to the primary winding of a step-up transformer 13, whose secondary winding may be connected to the input of a conventional A. C. amplifier 14. If desired, the output of the amplifier 14 may be used to energize a recording device 15 to make a permanent record of the output signal from the bridge 11 or to actuate a warning signal device or other apparatus.

Because of the transformer 13 a D. C. or slowly varying output signal from the bridge circuit 11 will not be coupled to the input of the amplifier and hence will not give an indication on the recorder 15. However, if the resistance of the bolometer element changes momentarily, an output pulse will appear across the primary and secondary windings of transformer 13 and will be amplified and recorded.

A conventional bolometer such as is used in the apparatus of the invention is generally equally sensitive to infrared radiant energy of most wavelengths ranging from $1\mu$ to $100\mu$. However, it has been discovered that the earth's atmosphere permits only a small portion of the infrared radiation from the sun to reach the surface of the earth, and the wavelengths of this radiation are for the most part between $1\mu$ and $5\mu$ with a small amount of radiation in the region of ten microns. Furthermore, it has been found that substantially all of the infrared radiation from a hot object at 100° C. has wavelengths greater than five microns. Therefore, in order to limit the response of the bolometer to radiation from a passing hot object, various filters are provided in the path of the radiation from the object to the bolometer. Radiation from a hot object 16, such as a railway car journal box, is focused on the bolometer 10 by means of a lens 17 which passes radiation having wavelengths of approximately 1-13 microns. Interposed in the path of the radiation between the lens and the bolometer is a filter 18, which serves to pass only that radiation having wavelengths greater than approximately five microns. It is apparent, of course, that the filter 18 may be placed between the hot object 16 and the lens 17 rather than in the position shown, and the lens 17 may serve only as a filter and have no focusing power, if desired.

The lens 17, which focuses the radiation on the variable resistance element of the bolometer, is preferably constructed of arsenic trisulfide ($As_2S_3$) which has a spectral wavelength passband approximately 12 microns wide centered in the neighborhood of seven microns. The transmission characteristics of the lens are illustrated by curve 20 in Fig. 2a, in which percent transmission and wavelength are the ordinate and abscissa, respectively, of the graph. It is pointed out that little benefit is derived from the filtering action of the lens. However, a lens made of a material other than glass or quartz is necessary because these materials are relatively opaque to radiation having wavelengths greater than approximately seven microns, which would tend to block the majority of the radiation from a hot object.

The filter 18 is of silver chloride type that passes virtually no radiation having wavelengths shorter than four microns. Such filters are well-known and are available commercially from Eastman Kodak Company, by whom they are designated as Type 200S. The transmission curve for a filter of this type is illustrated as curve 21 in Fig. 2a. It is to be understood that the present invention is not limited to the use of this particular filter and any filter that functions in substantially the same manner may be employed.

It was previously pointed out that practically all of the energy radiated from an object at a temperature of 100° C. has wavelengths greater than five microns. Therefore, the combination of the arsenic trisulfide lens 17 and the silver chloride filter 18 permits only that radiation having wavelengths lying between approximately five and 13 microns to reach the bolometer. The characteristics of the combination of lens 17 and filter 18 are shown by curve 22 of Fig. 2b.

It is desirable to decrease even the small amount of radiation from the sun that reaches the bolometer in the wavelength band between nine and 11 microns. This may be accomplished by providing the lens 17 with a thin silicon monoxide (SiO) coating. Such coatings and their action are described in an article entitled "Optical Properties of Silicon Monoxide" by G. Hass and C. D. Salzberg, published in the Journal of the Optical Society of America, March 1954 The transmission characteristics of such a coating are shown by curve 23 of Fig. 2a from which it is apparent that the silicon monoxide coating is relatively opaque to radiation having wavelengths of nine to 11 microns and passes a small amount of radiation in the region of 12 microns' wavelength and beyond.

As previously mentioned, the combination of the arsenic trisulfide lens 17 and the silver chloride filter 18 provides a filter whose characteristics are shown by curve 22 of Fig. 2b. When the silicon monoxide coating is added to the lens 17, the transmission characteristics of the combination are changed to those represented by curve 24 of Fig. 2b. It is seen from a study of that curve that radiation having wavelengths between approximately five and nine microns are passed by the combination, but no radiation having wavelengths of approximately nine to 11 microns is passed. A small amount of radiation in the 11–13 micron band is passed. This fact increases the sensitivity of the system because only a small amount of the sun's radiation in that region is passed by the earth's atmosphere, while a large amount of the radiation from a hot object lies in that region.

Reviewing the operation of the apparatus, it is seen that infrared radiation covering the wavelength spectrum from one micron to 100 microns is incident on the apparatus. The arsenic trisulfide lens 17 passes a wavelength band approximately 12 microns wide and centered in the region of seven microns wavelength. This band is restricted by the silicon monoxide coating of the lens, which removes those wavelengths lying between nine and 11 microns, and the transmission is further restricted by the silver chloride filter 18 that passes only those wave-lengths above approximately five microns. Thus, the radiation finally incident on the variable resistance element of the bolometer 10 consists primarily of energy in the five to nine micron wavelength bands with a small amount in the 11–13 micron band.

When a hot object passes within the range of the apparatus and its infrared radiation passes through the lens and filter and falls on the bolometer resistive element, the resistance of the element changes and momentarily unbalances the bridge circuit into which it is connected. Thus, a pulse is provided which may be amplified and used to actuate a recorder or other equipment. The gain of the amplifier may be varied to adjust the sensitivity of the apparatus to the desired level.

It is pointed out that the bolometer should be protected from radiation other than that transmitted through the lens and filter combination or the discrimination of the apparatus between radiation from the sun and from a passing hot object will be destroyed.

While a particular embodiment of the invention has been illustrated, it is understood that the invention is not limited thereto since various modifications may be made by one skilled in the art. It is contemplated by the appended claims to cover all such modifications as fall within the true spirit and scope of the invention.

What I claim as new and desire to secure by Letters Patent of the United States is:

1. In an apparatus for detecting infrared radiation from an object in the presence of extraneous foreign radiation, the combination comprising a radiation detector, a lens for focusing said radiation on said detector, said lens passing radiation having wave lengths of less than 13 microns, a silicon monoxide filter coating on said lens for removing from said radiation that radiation having wave lengths between 9 and 11 microns, and a second filter located between said object and said detector in the path of said radiation for removing therefrom that radiation having wave lengths less than 5 microns whereby said detector is substantially insensitive to said extraneous radiation.

2. In an apparatus for detecting infrared radiation from an object against a background of extraneous foreign radiation, the combination comprising a detector, an arsenic trisulfide lens for focusing said radiation on said detector and passing radiation having wave lengths of less than 13 microns, a silicon monoxide coating on said lens for removing from said radiation that radiation having wave lengths between 9 and 11 microns, and a silver chloride filter located between said object and said detector in the path of said radiation for removing therefrom that radiation having wave lengths less than 5 microns whereby said detector is substantially insensitive to said extraneous radiation.

References Cited in the file of this patent

UNITED STATES PATENTS

| Number | Name | Date |
| --- | --- | --- |
| 1,176,313 | Pfund | Mar. 21, 1916 |
| 2,109,235 | Kott | Feb. 22, 1938 |
| 2,531,000 | Scott | Nov. 21, 1950 |
| 2,552,184 | Koch | May 8, 1951 |
| 2,641,954 | Scharf et al. | June 16, 1953 |
| 2,660,925 | Turner | Dec. 1, 1953 |
| 2,687,611 | Larsen | Aug. 31, 1954 |
| 2,692,950 | Wallace | Oct. 26, 1954 |
| 2,708,389 | Kavanagh | May 17, 1955 |